US010410443B2

(12) United States Patent
Peach et al.

(10) Patent No.: US 10,410,443 B2
(45) Date of Patent: Sep. 10, 2019

(54) SYSTEM AND METHOD TO CONTROL ACCESS TO HAZARDOUS MACHINES

(71) Applicant: Schlumberger Technology Corporation, Sugar Land, TX (US)

(72) Inventors: James Peach, Asker (NO); Pavel Mikhailovich Podgurskiy, Yuzhno-Sakhalinsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/765,164

(22) PCT Filed: Sep. 30, 2016

(86) PCT No.: PCT/US2016/054612
§ 371 (c)(1),
(2) Date: Mar. 30, 2018

(87) PCT Pub. No.: WO2017/059174
PCT Pub. Date: Apr. 6, 2017

(65) Prior Publication Data
US 2018/0293822 A1    Oct. 11, 2018

(30) Foreign Application Priority Data

Oct. 1, 2015 (RU) .................................. 2015141877

(51) Int. Cl.
*G07C 9/00* (2006.01)
*H04W 12/08* (2009.01)
(Continued)

(52) U.S. Cl.
CPC ......... *G07C 9/00087* (2013.01); *G06F 21/35* (2013.01); *G06F 21/629* (2013.01); *H04W 12/08* (2013.01)

(58) Field of Classification Search
CPC ............ G07C 9/00007; G07C 9/00111; G07C 9/00309; G07C 9/00103; G07C 9/00571;
(Continued)

(56) References Cited

U.S. PATENT DOCUMENTS 6,850,153 B1    2/2005    Murakami et al.
7,032,816 B2 *  4/2006    Markham .............. G06Q 10/00
                                                    235/375

(Continued)

FOREIGN PATENT DOCUMENTS

EP       1231765 A2    8/2002
RU       2251747 C2    5/2005
RU     2014101553 A    7/2015

*Primary Examiner* — Mark S Blouin
(74) *Attorney, Agent, or Firm* — Rachel E. Greene (57) ABSTRACT

A system and method for controlling usage of a machine by an operator includes a card containing identity information related to the operator selectively in communication with an access device and a first server is in communication with the access device. The identity information is communicated to the access device. The first server includes training information for at least one operator and at least one training certificate. Identity information is communicated to the first server from the access device and the first server compares the identity information to the training information to identify whether the operator has a training certificate for the selected machine. The first server communicates to the access device that the operator does or does not have a training certificate for the selected machine. The access device permits instruction from the operator to the machine when the operator does have a training certificate for the selected machine.

20 Claims, 4 Drawing Sheets

(51) Int. Cl.
*G06F 21/35* (2013.01)
*G06F 21/62* (2013.01)

(58) Field of Classification Search
CPC ............ G07C 9/00896; G07C 9/00087; G07C 9/00166
USPC ......................................................... 340/5.6
See application file for complete search history.

(56) References Cited

U.S. PATENT DOCUMENTS

| | | |
|---|---|---|
| 2005/0125661 A1* | 6/2005 | Vaidyanathan ......... G06F 21/53 713/166 |
| 2007/0078536 A1* | 4/2007 | Gordon ................ G05B 19/409 700/83 |
| 2009/0062950 A1 | 3/2009 | Chen |
| 2009/0143878 A1 | 6/2009 | Staub et al. |
| 2009/0233572 A1 | 9/2009 | Basir |
| 2010/0289616 A1 | 11/2010 | Tehranchi et al. |
| 2018/0293822 A1* | 10/2018 | Peach ................ G07C 9/00087 |

* cited by examiner

SYSTEM AND METHOD TO CONTROL ACCESS TO HAZARDOUS MACHINES

BACKGROUND

The present disclosure relates to safety devices for controlling access to and use of hazardous machinery and equipment. More specifically, the disclosure relates to hazardous machinery access controls activated by access control cards issued to users of such machinery and equipment.

Equipment and machinery located, e.g., in a manufacturing facility, can be hazardous to personnel in the area proximate the equipment and machinery. Using machinery or equipment with inadequate training or with inadequate control over access to the equipment can result in injury to the user or other personnel, damage to the equipment, harm to business reputation of the equipment's owner or controlling entity, non-productive time due to incident investigation or equipment damage, and, in extreme cases, loss of life.

It would be helpful to have a system for controlling access to and use of hazardous equipment and machinery so that only suitably trained individuals are able to use the equipment and machinery.

SUMMARY

In one aspect, the disclosure is generally related to a system for controlling usage of a machine by a human operator. The system includes an access control card containing identity information related to the operator, an access control device in signal communication with an operating control of a selected machine and selectively in communication with the access control card and an access control computer in communication with the access control device. The identity information is communicated from the access control card to the access control device. The access control computer include identity information for at least one human operator. Identity information from the access control card is communicated to the access control card from the access control device and then to the access control computer. The access control computer compares the identity information from the access control card to stored identity information to identify whether the human operator identity information is consistent with the required qualifications to operate the selected machine. The access control computer communicates to the access control device that the human operator is or is not authorized to operate the selected machine. The access control device permits control instruction from the human operator to the machine when the operator is determined to be qualified to operate the selected machine.

In another aspect, the present disclosure is related to a method for restricting usage of a machine to authorized human operator(s). The method includes entering into or placing proximate an access control device associated with a selected machine an access control card including identity information for a human operator. The method further includes communicating the identity information from the access control card to the access control device and from the access control device to an access control computer. Identity information for the operator stored on the server is compared to the identity information communicated from the access control card. The result of the comparison is communicated to the access control device. The access control device permits the operator to operate the selected machine when the comparison communicated indicates the operator is currently authorized to operate the selected machine or restricts the operator from operating the selected machine when the comparison indicates the operator is not currently authorized to operate the machine.

Other aspects and advantages will be apparent from the following description and the appended claims.

DETAILED DESCRIPTION

Figure 1:
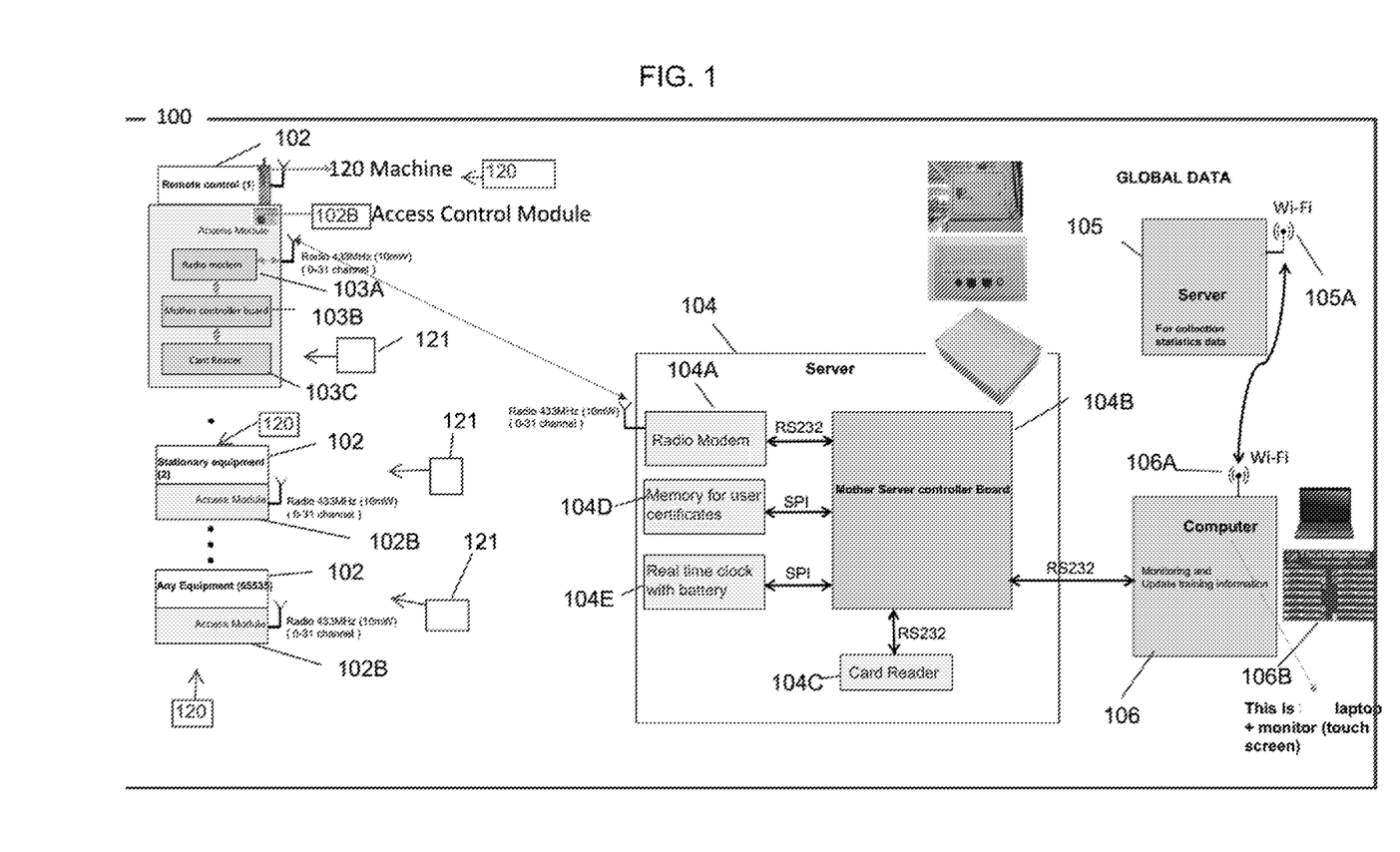
FIG. 1 is a schematic view of an example system according to the present disclosure.

Referring to FIG. 1, the present disclosure relates to a system 100 for controlling or restricting usage of or access to one or more machines 120 by one or more human operators. Each human operator who is authorized use a particular machine 120 may have assigned to him an access control card (102A in FIG. 2A), such as a smart card (having, for example, an embedded electrically erasable programmable read-only memory chip—EEPROM), a magnetic data recording strip, a bar code or a radio frequency identification (RFID) element. The access control card (102A in FIG. 2A) contains certain identifying information related to the particular human operator. The access control card (102A in FIG. 2A) may, for example, be embedded in or be part of an employee identification badge or similar instrument. Information encoded on the access control card (102A in FIG. 2A) relates to the human operator by including information such as, for example and without limitation, the name of the person and a unique identifier, such as an employee number, for example, as well as data concerning any machine or equipment operation training and/or qualification and the effective dates of such training and/or qualification. Such information will hereafter be referred to as "identity information." The access control card (102A in FIG. 2) may include the identity information in such a way that it is electronically readable by another device, to be explained further with reference to FIG. 2A.

Example devices for reading the identity information from the access control card (102A in FIG. 2) may include an access control module 102B in signal communication with an operator control device 102. The operator control device 102 may be a control for operating an associated machine 120. The operator control device is in signal communication with a respective machine 120 or equipment to be controlled by a human operator. Signal communication between the operator control device 102 and the machine 120 or equipment may be wireless as shown in FIG. 1, e.g., using communication protocol such as IEEE standard 802.11n or 802.11ac or other radio communication channel. In some embodiments, the operator control device 102 may communicate with the machine 120 using a low power radio frequency communication, for example and without limitation a multichannel 433 MHz bi-directional radio system. In other embodiments, communication between the operator control device 102 and the machine 120 may be conducted over wires, e.g., a CAT5 or CAT6 Ethernet cable.

A human operator attempting to gain access to a particular machine 120 for use in the operator's job duties will cause the access control card (102A in FIG. 2A) to communicate with the access control device 102B associated with or in signal communication with a respective operator control device 102 to enable control of the specific machine 120. In some embodiments, the access control device 102B may be in signal communication directly with an access control computer 104, to be explained further below.

In an example embodiment, the access control device 102B may comprise a card reader 103C which is configured to interrogate information stored on the access control card (102A in FIG. 2A) inserted into or placed proximate the card reader 103C. A controller 103B decodes and communicates information from the interrogated access control card (102A in FIG. 2A) to a radio modem 103A. The radio modem 103A may be in communication with a corresponding radio modem 104A in an access control computer 104 (which may be a server or other general purpose programmable computer).

Figure 2A:
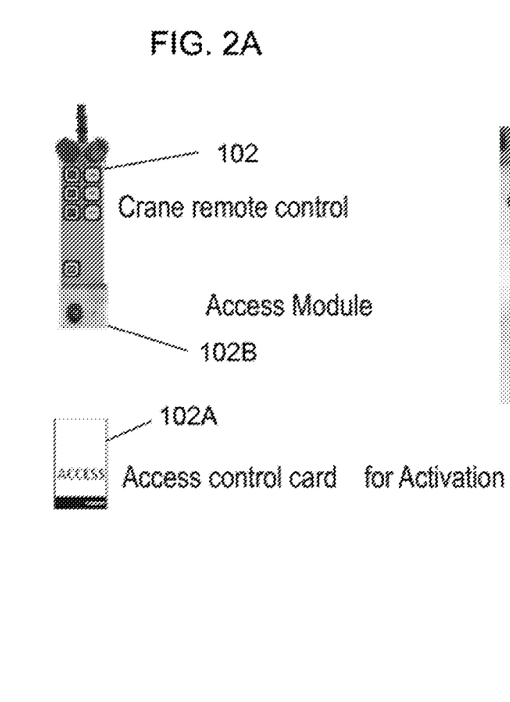
FIGS. 2A and 2B show an example embodiment of a remote control for a machine having an access control device and an access control card according to the present disclosure.
Figure 2B:
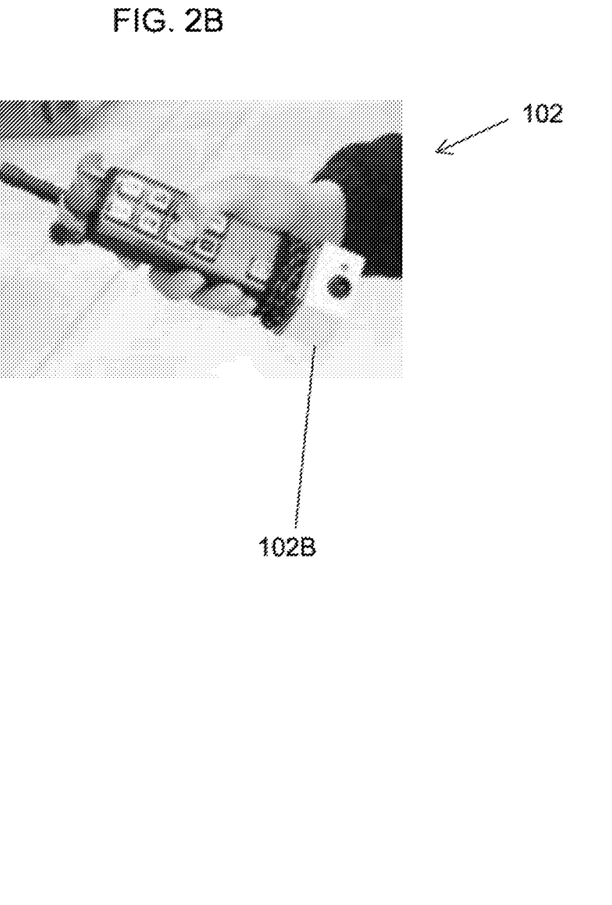

Referring to FIG. 2A, interrogation of the access control card 102A may be performed, for example, by inserting or placing the access control card 102A into or in proximity to the access control device 102B or similar interface that may be associated with the machine or equipment operator control device 102. The access control device 102B may include an electronic mechanism (see 103A, 103B, 103C in FIG. 1) for reading the access control card 102A presented by the human operator. The structure of such mechanism will be related to the type of identity information stored on the access control card 102A. FIG. 2B shows a human operator using the operator control device 102 having its access control device 102B attached thereto.

Referring once again to FIG. 1, the access control device 102B may include the above described card reader 103C, e.g., a receiver for receiving (e.g., magnetic data strip reader or RFID interrogation element) or a reader for reading (e.g., a barcode reader) the identity information from the access control card (102A in FIG. 1) and a transmitter for transmitting the information obtained from the access control card (102A in FIG. 1) to the access control computer 104, e.g., a first server. Transmission of the identity information may be made wirelessly using any suitable form of radio communication, including, without limitation, a 433 MHz multichannel two-way radio channel, or may be made using a wired communication channel. The access control device 102B if so configured may require little power to operate, such as between about 1.5 and 3.6 V and may be powered using, for example, a local battery for wireless communication embodiments. In some embodiments, communication between the access control device 102B, the operator control device 102 and the machine 120 may be performed by hard wiring, for example, into the particular machine 120 or equipment to be operated.

Referring once again to FIG. 1, the access control computer (first server) 104 may comprise access to externally stored or internally stored identity information for at least one human operator, or for a plurality of specific human operators at a particular equipment or machinery physical location. The identity information included on the access control computer (first server) 104 may comprise information related to the training status for each human operator. For example, training status may include each machine 120 that a particular human operator has certified training to operate and the start and end dates for which such certified training is valid. Training status for each human operator may comprise corresponding training information for more than one machine 120. The access control computer 104 may comprise a clock 104E for timing operations performed by the central processor 104B. The access control computer (first server) 104 may include any form of data storage and retrieval device 104D, e.g., an external memory or hard drive where the identity information for each human operator is stored and can be interrogated by the access control computer (first server) 104. The processor 104B in the data storage and access control computer 104 is operable to interrogate stored training information on request from the access control computer 104 for each human operator who presents an access control card (102A in FIG. 2) to an access control device 102B. If the human operator identity information is valid with respect to operation of the particular machine 120, an access approval signal or message may be communicated from access control computer (first server) 104 to the particular access control device 102B using, for example and without limitation, a radio modem 104A in wireless communication with the access control device 102B. The access control device 102B may receive an access approval signal or message from the access control computer 104 and then enables operation of the specific machine 120 by the specific human operator using the relevant operator control device 102.

In some embodiments, enabling control of the specific machine 120 may comprise the specific machine 120 being connected to an electric power supply by the access control device 102B or by the access control computer (first server) 104. In some embodiments, the particular access control device 102B associated with the corresponding operator control device 102 may be activated to enable control of the particular machine 120 by the particular human operator or any other human operator having valid stored identity information by causing the access control device 102B to enable or activate the machine operator control device 102. If the identity information is not valid with respect to the particular machine 120, the access control computer (first server) 104 may not send any approval signal or message and the machine 120 and/or the associated operator control device 102 will not be activated Thus, if the human operator's access control card 102A has valid identity information to authorize use of the particular machine 120, then the access control device 102B will be activated by the access control computer (first server) 104 to permit the human operator to use the particular machine 120. If, on the other hand, the human operator's access control card 102A does not have valid identity information to enable the human operator to use the particular machine 120, then the access control device 102B prevents operation of the particular machine 120, e.g., by not enabling the machine operator control 102 or the access control computer 104 may not send a power-up command to the machine or an activation signal to the machine operator control. Such denial of operation may also be effected by having the access control computer (first server) 104 not send an actuation signal or message to the relevant access control device 102B or machine operator control 102.

The processor 104B associated with the access control computer (first server) 104 may monitor at least one parameter of the selected machine 120. Examples of machine parameters to be monitored include operating hours, the identity of the human operator who operated the particular machine, machine loads, machine temperatures, etc. Such parameters may be measured by one or more sensors 121 associated with each machine 120. The sensors 121 may be in signal communication with the processor 104B either by a wired signal channel (e.g., Ethernet, RS-232 serial connection, USB connection) or by a wireless channel, e.g., IEEE 802.11n or 802.11ac standard wireless channel.

A computer display or monitor 106B may also be in signal communication with a monitoring computer 106. The monitoring computer 106 may be in signal communication with the access control computer, for example, by serial connection such as RS-232 or USB. The monitor 106B may display some or all of the identity information, such as an operator name, and the particular machine when that operator is permitted to operate the particular machine 120. The display 106B may also display the one or more measured parameters for one or more specific machines 120.

The machine(s) 120 may be, for example, any machine used in manufacturing. Examples of such machines include, without limiting the scope of the present disclosure, a heating oven, a forklift, an overhead crane, a break out machine, grinding machine, shock machine, and/or a key box. Other examples of machines may include presses, lathes, injection molding machines, fastening equipment, etc.

The monitoring computer 106 may be in signal communication with a remote data storage computer or server 105. Machine parameters and identity information may be communicated to the remote data storage server 105 from the monitoring computer 106, e.g., using wireless communication devices 105A, 106A, respectively. The wireless communication devices may be radio communication devices using, for example, IEEE standard 802.11n or 802.11ac communication protocol. The remote server 105 may include a processor (not shown separately) that can perform analysis, e.g., statistical analysis, on the measured machine parameters and communicate the analysis results to a computer in or associated with the monitoring computer 106. Communication may also be performed using Ethernet cable, RS-232 serial cable, USB connection wired channel or otherwise communicated using any form of wired or wireless signal communication channel.

Signal output from the various sensors 121 associated with each machine 120 may be input to the access control computer 104 for local processing therein or for communication to the monitoring computer 106 and/or remote server 105.

A method for restricting usage of a machine by a human operator includes initiating signal communication between an access control device 102B on a selected machine 120 and an access control card 102A in the possession of any human operator intending to use the selected machine 120. The access control card 102A includes identity information related to the human operator, such as a name and/or employee number. The human operator selectively presents the access control card 102A to the access device 102B on the selected machine 120 when the human operator is ready to use the machine 120. The human operator will place the access control card 102A on or near the access control device 102B such that the access control card 102A may be interrogated by the access control device 102B.

Identity information stored on the access control card 102A presented by the human operator is communicated to the access control device 102B. The identity information is then communicated from the access control device 102B to an access control computer (first server) 106. The identity information may be communicated using any suitable wired or wireless communication technique, including, without limitation, radio frequency such as multichannel 433 MHz radio.

Identity information related to the training status of each operator for each machine in a particular location may be provided to the access control computer (first server) 104. The first server 104 may include a processor 104B capable of interrogating identity information and determining whether the identity information is valid for the selected machine 120 and the particular human operator. While the above described embodiment has identity information stored on a local data storage device 104D, some or all of the same identity information may be stored on the access control card 102A.

If the operator has identity information that is valid, then the access control computer (first server) 104 communicates via wired or wireless connection to the access control device 102B that the operator may use the selected machine or equipment. If the operator's identity information is invalid, e.g., the human operator has not successfully completed training for the specific machine 120 or the training is out-of-date, then the access control computer (first server) 104 may communicate an access authorization signal using wired or wireless communication to the access control device 102B that the human operator is not authorized to operate the selected machine 120 and access to such machine 120 is not enabled by the access control device 102B. In other embodiments, an access approval signal may simply not be communicated to the access control device 102B by the first server 106 when the identity information on the access control card 102A is not valid to enable operation of the specific machine.

Information including certain identity information of the operator, such as an operator name, and the selected machine may be displayed by a monitor 106B in signal communication with the monitoring computer 106.

Selected equipment may include a control device 102 configured to operate an associated machine 120. When a human operator activates the control device 102 of the selected machine by using the access control card 102A, the identity information stored on the access control card 102A may be sent to the access control computer (first server) 104 e.g., by radio communication or wired communication. The access control computer (first server) 104 validates the identity information by interrogating the data storage and retrieval device 104D to enable activating the machine or equipment by the specific human operator. If the identity information is valid, the access control computer (first server) 104 may send an activation signal or message e.g., through the radio or wired signal communication channel to enable the human operator to activate the specific machine or equipment. Some of the identity information and machine operating parameters may be displayed on the monitor 106B and sent to the remote server 105 for analysis, e.g., times of use of each machine 120, name of operator of each machine 120, and any of a number of sensor-derived machine operating parameters. In some embodiments, the functions of the access control computer 104 and the monitoring computer 106 may be performed by the same computer and/or processor.

The described system 100 may facilitate confirming training statuses of individual human operators on all machines or equipment through the identity information associated with each access control card 102A, making it unnecessary for the human operator to surrender the access control card 102A when, for example, training has expired or the human operator is no longer provided access to the physical location of the machine(s) such as on termination of employment or transfer of the human operator to a different facility. Parameters that may be monitored for the machine(s) or equipment may include the equipment name or identification number, location, time in use, human operators using such equipment, as well as operational data. Such data may be communicated to the remote server 105 and real time analysis may be performed. Such analysis may include how efficiently each human operator operates each respective machine 120, and the amount of time each operator uses each machine 120. Attempts to gain access to a specific machine 120 by an operator not having correct identifying information may be recorded and communicated (e.g., wirelessly) to a remote system operator to identify inappropriate human operator behavior, or the presence of an unauthorized person attempting to gain access to operation of a specific machine 120.

The system 100 may be programmed (e.g., in access control computer 106) such that any initial safety controls are satisfied prior to permitting a human operator to operate a selected machine. 120 One such example of this type of restricted access is that the system 100 would confirm that a daily crane check operation was performed prior to permitting any operator to use a crane. A priori safety or pre-use inspection records may be associated with enabling operation of any other machine 120 in a similar manner.

The system 100 may display the selected machine 120 and the operator's name using such selected machine on the monitor 106B. Such operation can prevent attempts by another operator to activate a selected machine 120 without an access control card 102A.

Figure 3:
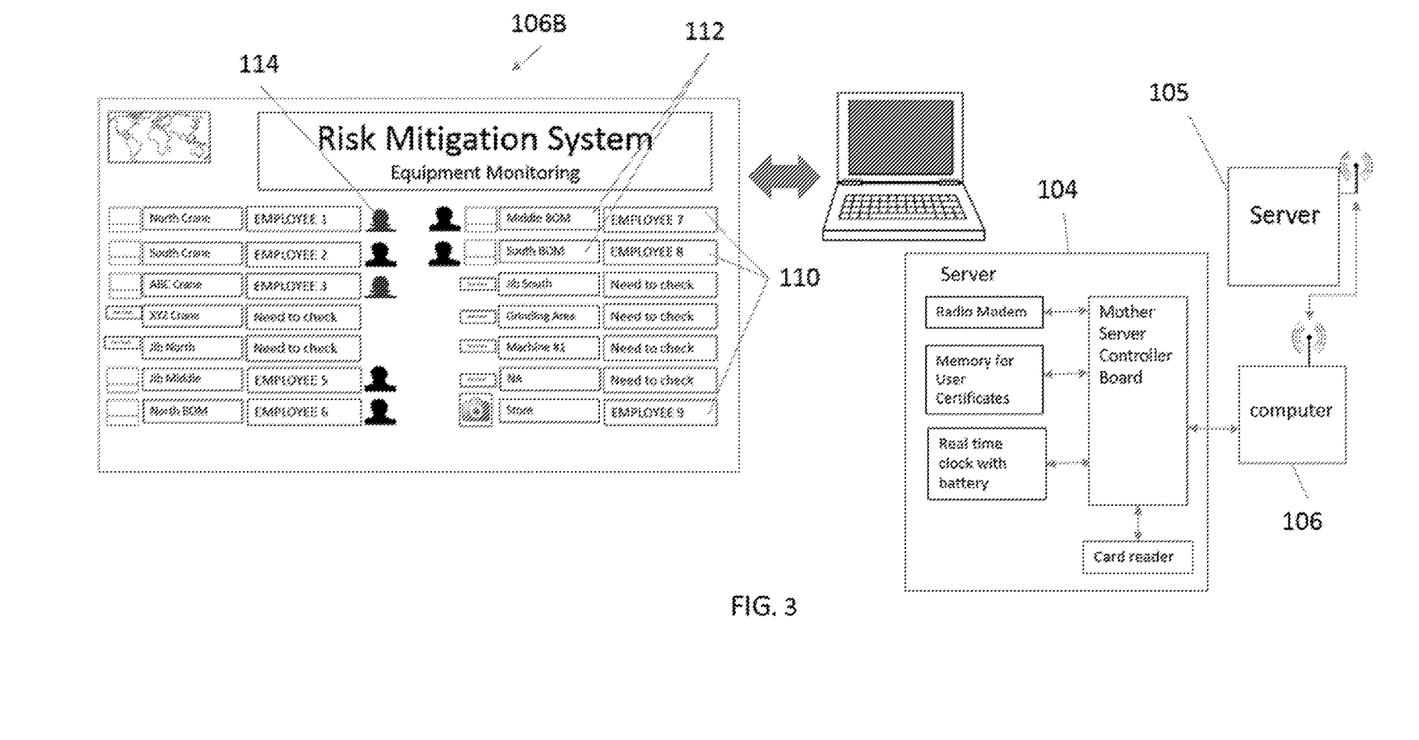
FIG. 3 shows an example embodiment of a display showing machines in use and the operators have access thereto.

FIG. 3 shows an example of the display 106B. The display in FIG. 3 shows each machine 110, the operator 112 who has gained access to any one or more machines including an image 114 of the particular operator. In this way, a system supervisor can readily determine which machines are in use and by which human operators.

Figure 4:
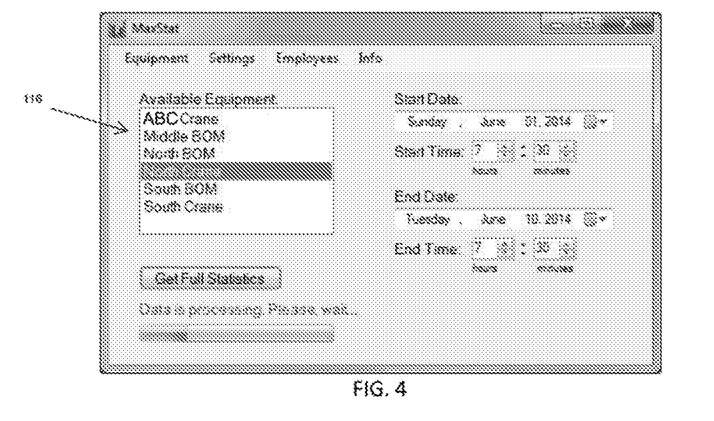
FIG. 4 shows an example data input display to enable calculation of relevant usage information for each of a plurality of operated machines.

FIG. 4 shows an example input display 116 to the data analysis computer (105 in FIG. 1) wherein specific machines, times of operation and other calculated operating information may be requested in certain forms, e.g., histograms or graphs.

Figure 5:
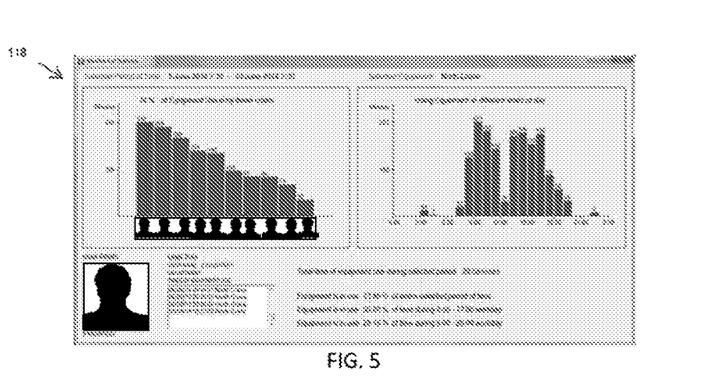
FIG. 5 shows an example embodiment of a display screen for accumulated operating data for a specific machine and is operators.

FIG. 5 shows example machine operation parameters obtained from the remote server (105 in FIG. 1) that may be displayed 118 in bar graph and histogram forms, as non-limiting examples. Any of the measurements made by the respective sensors (121 in FIG. 1) may displayed in correspondence with the times at which each authorized human operator uses the specific machine (120 in FIG. 1) so that how well each human operator controls each respective machine (120 in FIG. 1) may be displayed. Identity information, for example, imminent expiration of a certain human operator's qualifying training, may be displayed by the analysis computer or the access control computer so that the system supervisor may be able to take corrective action (e.g., scheduling qualifying training) with respect to such human operator.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. A system for controlling usage of a machine by a human operator comprising:

a card containing identity information related to the human operator;

an access control device selectively in communication with the card, wherein the identity information is communicated to the access control device, the access control device in signal communication with a machine operator control;

an access control computer in communication with the access control device, wherein the access control computer is in signal communication with a data storage device having machine operation control information for at least one human operator;

wherein identity information from the card is communicated to the access control computer from the access control device and the access control computer compares the identity information to the machine operation control information;

wherein the access control computer performs at least one of (i) communicates to the access control device that the human operator is enabled to operate the machine, (ii) communicates the access control device that the human operator is denied access to operate the machine and (iii) does not communicate to the access control device wherein the human operator is denied access to operate the machine.

2. The system of claim 1 further comprising:

a computer display to display the identity information and a machine identifier when the human operator is enabled to operate the machine.

3. The system of claim 1 wherein the access control device comprises a battery, wherein the battery is used to power the access control device.

4. The system of claim 1 wherein the card comprises at least one of a smart card having at least one of an embedded electrically erasable programmable read-only memory chip, a magnetic data recording strip, a bar code and a radio frequency identification (RFID) element and wherein the access control device comprises a data reader corresponding to and configured to extract identity information from the at least one of an embedded electrically erasable programmable read-only memory chip, a magnetic data recording strip, a bar code and a radio frequency identification (RFID) element.

5. The system of claim 1 wherein the access control computer monitors at least one machine operating parameter during operation of the machine.

6. The system of claim 5 further comprising:

a data analysis computer in signal communication with the access control computer, wherein the access control computer communicates identity information and the monitored machine operating parameter to the data analysis computer.

7. The system of claim 6 wherein the data analysis computer calculates an analysis based on the at least one monitored parameter.

8. The system of claim 7 wherein the calculated analysis is correlated with the identity information.

9. The system of claim 8 wherein the access control computer is in signal communication with a plurality of access control devices, each access control device in signal communication with a respective machine operating control.

10. The system of claim 1 wherein the machine comprises at least one of a heating oven, a forklift, an overhead crane, a break out machine and a key box.

11. A method for controlling use of a machine by a human operator comprising:

the human operator presenting a card to an access control device associated with a machine operator control configured to operate a respective machine, the card comprising identity information thereon corresponding to a human operator;

communicating the identity information from the card to the access control device;

communicating the identity information from the access control device to an access control computer;

comparing the identity information to qualification criteria accessible by the access control computer, the qualification criteria related to required qualifications to operate the machine; and at least one of (i) communicating from the access control computer to the access control device that the human operator is enabled to operate the machine, (ii) communicating from the access control computer to the access control device that the human operator is denied access to operate the machine and (iii) not communicating to the access control device wherein the human operator is denied access to operate the machine.

12. The method of claim 11 wherein the card comprises at least one of a smart card having at least one of an embedded electrically erasable programmable read-only memory chip, a magnetic data recording strip, a bar code and a radio frequency identification (RFID) element and wherein the access control device comprises a data reader corresponding to and configured to extract identity information from the at least one of an embedded electrically erasable programmable read-only memory chip, a magnetic data recording strip, a bar code and a radio frequency identification (RFID) element.

13. The method of claim 11 further comprising monitoring at least one machine operating parameter during operation of the machine.

14. The method of claim 13 further comprising causing the monitored machine operating parameter to be correlated to the human operator.

15. The method of claim 13 further comprising analyzing the at least one machine operating parameter.

16. The method of claim 15 wherein the calculated analysis is correlated with the identity information.

17. The system of claim 11 wherein the respective machine comprises at least one of a heating oven, a forklift, an overhead crane, a break out machine and a key box.

18. The method of claim 11 further comprising:

each of a plurality of human operators presenting a respective card to one of a plurality of access control devices each associated with a respective machine operator control configured to operate a respective machine, each card comprising identity information thereon corresponding to one of the plurality of human operators;

communicating the identity information from each card to the respective access control device;

communicating the identity information from the respective access control device to an access control computer;

comparing the identity information from each card to qualification criteria accessible by the access control computer, the qualification criteria related to required qualifications to operate each machine; and at least one of (i) communicating from the access control computer to the respective access control device that the respective human operator is enabled to operate the respective machine, (ii) communicating from the access control computer to the respective access control device that the respective human operator is denied access to operate the respective machine and (iii) not communicating to the access control device wherein the respective human operator is denied access to operate the respective machine.

19. The method of claim 11 further comprising analyzing the at least one machine operating parameter.

20. The method of claim 19 wherein the analysis is correlated with the identity information.

* * * * *